(12) United States Patent
Stone

(10) Patent No.: US 12,333,593 B2
(45) Date of Patent: Jun. 17, 2025

(54) SYSTEM AND METHOD FOR GREEN PROCUREMENT

(71) Applicant: Naomi Stone, Hermosa Beach, CA (US)

(72) Inventor: Naomi Stone, Hermosa Beach, CA (US)

( * ) Notice: Subject to any disclaimer, the term of this patent is extended or adjusted under 35 U.S.C. 154(b) by 0 days.

(21) Appl. No.: 17/200,002

(22) Filed: Mar. 12, 2021

(65) Prior Publication Data

US 2022/0292579 A1  Sep. 15, 2022

(51) Int. Cl.
*G06Q 30/00* (2023.01)
*G06Q 10/30* (2023.01)
*G06Q 30/0601* (2023.01)

(52) U.S. Cl.
CPC ......... *G06Q 30/0635* (2013.01); *G06Q 10/30* (2013.01); *G06Q 30/0641* (2013.01)

(58) Field of Classification Search
CPC .............. G06Q 30/00; G06Q 30/0601; G06Q 30/0613; G06Q 30/0621; G06Q 30/0641
See application file for complete search history.

(56) References Cited

U.S. PATENT DOCUMENTS

| | | | |
|---|---|---|---|
| 6,922,675 B1 * | 7/2005 | Chatterjee | G06Q 40/04 705/26.81 |
| 7,725,359 B1 * | 5/2010 | Katzfey | G06Q 30/0601 705/26.1 |
| 8,626,602 B2 | 1/2014 | George | |
| 8,738,432 B2 | 5/2014 | Hamilton, II et al. | |
| 11,232,500 B1 * | 1/2022 | Van Dyne | G06Q 30/0611 |
| 11,328,262 B2 * | 5/2022 | DiCarlo | G06Q 50/167 |
| 2001/0032162 A1 * | 10/2001 | Alsberg | G06Q 40/00 705/37 |
| 2001/0032170 A1 * | 10/2001 | Sheth | G06Q 10/103 705/26.1 |

(Continued)

OTHER PUBLICATIONS

Golroudbary, Saeed Rahimpour, and Seyed Mojib Zahraee. "System dynamics model for optimizing the recycling and collection of waste material in a closed-loop supply chain." Simulation modelling practice and theory 53 (2015): 88-102. (Year: 2015).*

(Continued)

*Primary Examiner* — Christopher B Seibert
(74) *Attorney, Agent, or Firm* — Omni Legal Group; Omid E. Khalifeh; Ariana K. Santoro

(57) ABSTRACT

A system and method for green procurement is provided. In certain embodiments, the system may comprise a buyer computing device and a seller computing device. The buyer computing device may receive identity information associated with the buyer, receive a desired material request from the buyer, the desired material request defined by one or more material characteristics, display at least one waste material listing, and receive and transmit a waste material order from one or more of the at least one waste material listing. The seller computing device may receive identity information associated with the seller, generate a seller account based on the identity information, receive a waste material supply from the seller, generate one of the at least one waste material listing based on the waste material supply, and receive the waste material order from the buyer computing device.

20 Claims, 6 Drawing Sheets

(56) References Cited

U.S. PATENT DOCUMENTS

| | | | |
|---|---|---|---|
| 2002/0152133 A1* | 10/2002 | King | G06Q 10/10 |
| | | | 705/26.81 |
| 2004/0243505 A1* | 12/2004 | Sweeting | G06Q 40/00 |
| | | | 705/37 |
| 2005/0177474 A1* | 8/2005 | Ma | G06Q 30/0633 |
| | | | 705/30 |
| 2006/0074780 A1* | 4/2006 | Taylor | G06Q 40/04 |
| | | | 705/37 |
| 2006/0080207 A1 | 4/2006 | Girija | |
| 2010/0205551 A1* | 8/2010 | Underwood | G06Q 30/0633 |
| | | | 715/760 |
| 2011/0047014 A1* | 2/2011 | De Angelo | G06F 3/0482 |
| | | | 715/810 |
| 2011/0137812 A1* | 6/2011 | Sherga | G06Q 40/04 |
| | | | 705/317 |
| 2012/0047080 A1* | 2/2012 | Rodatos | G06Q 10/30 |
| | | | 705/308 |
| 2012/0109713 A1* | 5/2012 | Wilhite | G06Q 30/0611 |
| | | | 705/26.4 |
| 2012/0226620 A1* | 9/2012 | Junger | G06Q 30/00 |
| | | | 705/304 |
| 2014/0258032 A1* | 9/2014 | Psota | G06Q 10/08 |
| | | | 705/26.35 |
| 2015/0073929 A1* | 3/2015 | Psota | G06Q 30/0201 |
| | | | 705/26.2 |
| 2015/0170238 A1* | 6/2015 | O'Malley | G06Q 30/0611 |
| | | | 705/26.4 |
| 2015/0363725 A1* | 12/2015 | Andersson | G06Q 10/0631 |
| | | | 705/7.23 |
| 2016/0071033 A1* | 3/2016 | Davis | G06Q 10/0833 |
| | | | 705/7.15 |
| 2016/0370792 A1* | 12/2016 | Jacobs | B29C 64/35 |
| 2018/0025375 A1* | 1/2018 | Armen | G06Q 30/0227 |
| | | | 705/14.27 |

OTHER PUBLICATIONS

Cimpan, Ciprian, et al. "Central sorting and recovery of MSW recyclable materials: A review of technological state-of-the-art, cases, practice and implications for materials recycling." Journal of Environmental Management 156 (2015): 181-199. (Year: 2015).*

* cited by examiner

SYSTEM AND METHOD FOR GREEN PROCUREMENT

GOVERNMENT CONTRACT

Not applicable.

CROSS-REFERENCE TO RELATED APPLICATIONS

Not applicable.

STATEMENT RE. FEDERALLY SPONSORED RESEARCH/DEVELOPMENT

Not applicable.

COPYRIGHT & TRADEMARK NOTICES

A portion of the disclosure of this patent document may contain material which is subject to copyright protection. This patent document may show and/or describe matter which is or may become trade dress of the owner. The copyright and trade dress owner has no objection to the facsimile reproduction by any one of the patent document or the patent disclosure, as it appears in the Patent and Trademark Office patent files or records, but otherwise reserves all copyrights and trade dress rights whatsoever.

TECHNICAL FIELD

The disclosed subject matter relates generally to green procurement systems and methods and, more particularly, to a system and method for green procurement having a computing device associated with a buyer and a computing device associated with a seller and which receives a desired material request, either for a material having one or more characteristics or for a particular end use, and generates relevant waste material listings, thereby providing enhanced efficiency in recycling of waste materials.

BACKGROUND

More than 12 billion tons of industrial waste are generated annually in this country. Despite this statistic, there are a number of industries that could readily utilize some or all of this waste material in a productive fashion. Furthermore, economic and environmental concerns have contributed to rising interest in green procurement, which is the purchase of environmentally friendly products and services. Indeed, the aim of green procurement is to transact with products and services having a smaller-than-average environmental footprint. While a number of factors contribute to this assessment, recycled content, energy efficiency and waste reduction are often viewed as the most desirable attributes.

Not only does recycling of these materials save space in landfills and decrease emissions, it also saves virgin raw materials by providing an alternative for purchase. As a tangential benefit, green procurement also allows companies and municipalities to take credit for their environmentally friendly transactional decisions. Such positive impacts can be used to bolster environmental and corporate social responsibility (CSR) reports. Thus, there exists a need for a system and method for green procurement wherein waste materials are sold as raw materials. There also exists a need for a system and method for green procurement wherein the environmental impact of each transaction is tracked and analyzed in a meaningful way.

Some attempts have been made to provide computerized marketplaces for comparing and filter goods based on various characteristics. For instance, U.S. Pat. No. 8,626,602 to George teaches a distributed computerized shopping system having a web-enabled host computer hosting a central data repository which scours the Internet to compile comparative product information from millions of websites. This disclosure allows consumers to have access to truly informed product pricing with few keystrokes. However, this disclosure does not allow potential buyers to search for and select materials and/or products, including waste materials, based on various end-use attributes, such as cost, environmental impact, and geographic location.

As another example, U.S. Pat. No. 8,738,432 to Hamilton et al. discloses a system and method for segmenting items in a shopping cart by carbon footprint. This system and method not only provides a carbon footprint determination for each product, it also recommends substitute or alternative items. This teaching fails to track, analyze, and report on other environmental metrics related to each of the transactions. In this manner, buyers and sellers are unable to understand and report on the full environmental impact of their purchases and sales, respectively, and therefore, cannot demonstrate compliance with governmental mandates or CSR goals. Moreover, this patent is not aimed at specifically recycling waste materials so as to save virgin raw materials but instead provides insight into any items purchased.

As a result of the foregoing, there remains a need for a system and method for green procurement having the advantages discussed herein.

SUMMARY

The present disclosure is directed to a system and method for green procurement, which provides for computing devices capable of receiving a desired material request from a buyer and generating at least one waste material listing from a seller, thereby saving virgin raw materials by substituting waste materials so as to provide trackable environmentally friendly transactions. In many embodiments, and for purposes of brevity, the system and method for green procurement featuring the purchase and sale of a single waste material is shown and described. However, it will be understood that more than one waste material may be procured through this system and method. Moreover, throughout this discussion, the system and method refers to a single seller and a single buyer. However, a person of ordinary skill in the art will understand that for any desired waste material request for a buyer, there may be multiple material listings from multiple sellers.

For purposes of summarizing, certain aspects, advantages, and novel features have been described. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested.

In accordance with one embodiment, a green procurement system is provided that may comprise a computing device associated with a buyer (also referred to herein as the "buyer computing device") and a computing device associated with a seller (also referred to herein as the "seller computing device"). The computing device associated with the buyer may be operative to receive identity information associated with the buyer. The identity information may comprise personal information, delivery information and payment information. The delivery information may contribute to the filtering of at least one waste material listing. The payment information may allow the seller to charge the customer.

The buyer computing device may also be operative to receive a desired material request from the buyer. The desired material request may be defined by one or more material characteristics and a timeline. In certain embodiments, the one or more material characteristics may be more particularly defined by a specific material. In such instances, the buyer may know the specific material.

In other embodiments, the one or more material characteristics may comprise end use, cost, environmental impact, geographic location, any known suitable raw materials and any properties of the desired material, such as strength, malleability, durability. The geographic location may be based on a delivery location related to the buyer. In some embodiments, the delivery location may be the same as the delivery information provided as part of the identity information. In others, the delivery location may be different than the delivery information.

The buyer computing device may be further operative to display at least one waste material listing. In accordance with some embodiments, the buyer computing device may be operative to filter in one or more of the one or more material characteristics and based thereon, identify one or more suitable waste materials. The one or more suitable waste materials may comprise one or more of the one or more material characteristics. Further, the buyer computing device may be operative to identify and display the at least one waste material listing based on the one or more suitable waste materials.

According to certain embodiments, the desired material request may comprise a one-time request and in other embodiments, the desired material request may comprise an ongoing request. The ongoing request may be defined temporally as an annual request, a monthly request, a weekly request, or a customizable request. The one-time request may be defined temporally as urgent or non-urgent. In such embodiments, the timeline may also be defined as urgent, non-urgent, or ongoing, each of which may be further defined by the seller. In additional embodiments, the timeline may be further defined by the buyer, such as in a period of hours or days. Furthermore, the seller computing device may be operative to receive an opt-in for urgent request notifications from the seller and generate an urgent request notification. For instance, the seller may opt-in to the urgent request notifications if the seller may have the ability and desire to supply the desired material within the timeline.

The computing device associated with the buyer may be further operative to receive and transmit a waste material order from one or more of the at least one waste material listing. In some embodiments, the waste material order may comprise one waste material listing from one seller. In other embodiments, the waste material order may comprise more than one waste material listings from one or more sellers. Moreover, the waste material order may further define the timeline, which may further comprise a date and/or time, or a date and/or time range.

In accordance with some embodiments, the seller computing device may be operative to receive identity information associated with the seller. The identity information may comprise personal information, geographic information and financial information. The geographic information may contribute to the filtering of at least one waste material listing. In particular, the geographic information may comprise one or more geographic locations of the at least one waste material listing. The financial information may allow the seller to receive payment from the buyer and pay any concomitant fees.

The seller computing device may be operative to generate a seller account based on the identity information associated with the seller. The seller account may comprise an individual account or a professional account. The individual account may comprise sellers who non-dependably have waste materials to offer for sale. The professional account may comprise sellers, such as businesses that have excess waste material or those that routinely supply waste materials. The seller account may further comprise an occasional selling plan or an ongoing selling plan. In some embodiments, the seller account may comprise the individual account or the professional account having the occasional selling plan. In other embodiments, the seller account may comprise the individual account or the professional account having the ongoing selling plan.

In some embodiments, the seller computing device may be operative to receive a waste material supply from the seller. The waste material supply may correlate to one or more waste materials in the possession or ownership of the seller. The waste material supply may be defined by a material type, a material amount, a material cost, a material location, and a material timeline. The computing device associated with the seller may then be operative to generate one of the at least one waste material listing based on the waste material supply. In certain embodiments, the at least one waste material listing may be filtered to certain buyers depending on the geographic information. For example, the at least one waste material listing may only be displayed to buyers within a specified geographic region. Finally, the seller computing device may be operative to receive the waste material order from the buyer computing device.

The computing device associated with the buyer may be further operative to filter in the one-time request or the ongoing request. Responsive to the computing device filtering in the one-time request, the buyer computing device may be operative to display the occasional selling plan or the ongoing selling plan. In other embodiments, the buyer computing device may be operative to display the occasional selling plan and the ongoing selling plan. Responsive to the computing device filtering in the ongoing request, the buyer computing device may be operative to display the ongoing selling plan.

In certain embodiments, the system may be operative to filter in the one or more material characteristics and the one-time request or the ongoing request. In alternate embodiments, the system may be operative to filter in only the one or more material characteristics. In still other embodiments, the system may be operative to filter in only the timeline. Moreover, the system may filter in responsive to the buyer specifying the one or more material characteristics and/or the timeline.

In further embodiments, the buyer computing device and/or the seller computing device may be further operative to generate and display one or more environmental metrics. The one or more environmental metrics may comprise a landfill waste reduction, a raw material savings, an energy savings, a water savings, an emission reduction, a carbon credit, or one or more customizable metrics. The one or more environmental metrics may allow individuals or businesses to demonstrate environmentally friendly decisions and may further bolster business' environmental and corporate social responsibility (CSR) reports.

The green procurement method may comprise the steps of: providing a buyer computing device and a seller computing device; receiving, at the seller computing device, identity information associated with the seller; generating, at the seller computing device, a seller account based on the identity information associated with the seller; receiving, at the seller computing device, a waste material supply from the seller; generating, at the seller computing device, at least one waste material listing based on the waste material supply; receiving, at the buyer computing device, identity information associated with the buyer; receiving, at the buyer computing device, a desired material request from the buyer, the desired material request defined by one or more material characteristics and a timeline; displaying, at the buyer computing device, the at least one waste material listing; receiving and transmitting, at the buyer computing device, a waste material order from the at least one waste listing; and receiving, at the seller computing device, the waste material order.

According to certain further embodiments, the method may further comprise the steps of generating and displaying, at the buyer computing device and the seller computing device, one or more environmental metrics. In some embodiments, the one or more environmental metrics may comprise a landfill waste reduction, a raw material savings, an energy savings, a water savings, an emission reduction, a carbon credit, or one or more customizable metrics. A person of ordinary skill will recognize other environmental or related metrics may be generated and displayed in addition to or substituting for the aforementioned metrics.

In certain embodiments, the desired material request may be defined by one or more material characteristics. In such embodiments, the method may also comprise filtering in, at the buyer computing device, the one or more material characteristics; responsive to the buyer computing device filtering in the one or more material characteristics, identifying, at the buyer computing device, one or more suitable waste materials; and identifying and displaying, at the buyer computing device, the at least one waste material listing based on the one or more suitable waste materials.

In still further embodiments, the seller account may comprise an occasional selling plan or an ongoing selling plan and the desired material request may comprise a one-time request or an ongoing request. In these embodiments, the method may further comprise the steps of: filtering in, at the buyer computing device, the one-time request or the ongoing request; responsive to the computing device, filtering in the one-time request, displaying, at the buyer computing device, the occasional selling plan or the ongoing selling plan; and responsive to the computing device filtering in the ongoing request, displaying, at the buyer computing device, the occasional selling plan.

One or more of the above-disclosed embodiments, in addition to certain alternatives, are provided in further detail below with reference to the attached figures. The disclosed subject matter is not, however, limited to any particular embodiment disclosed.

Figure 1:
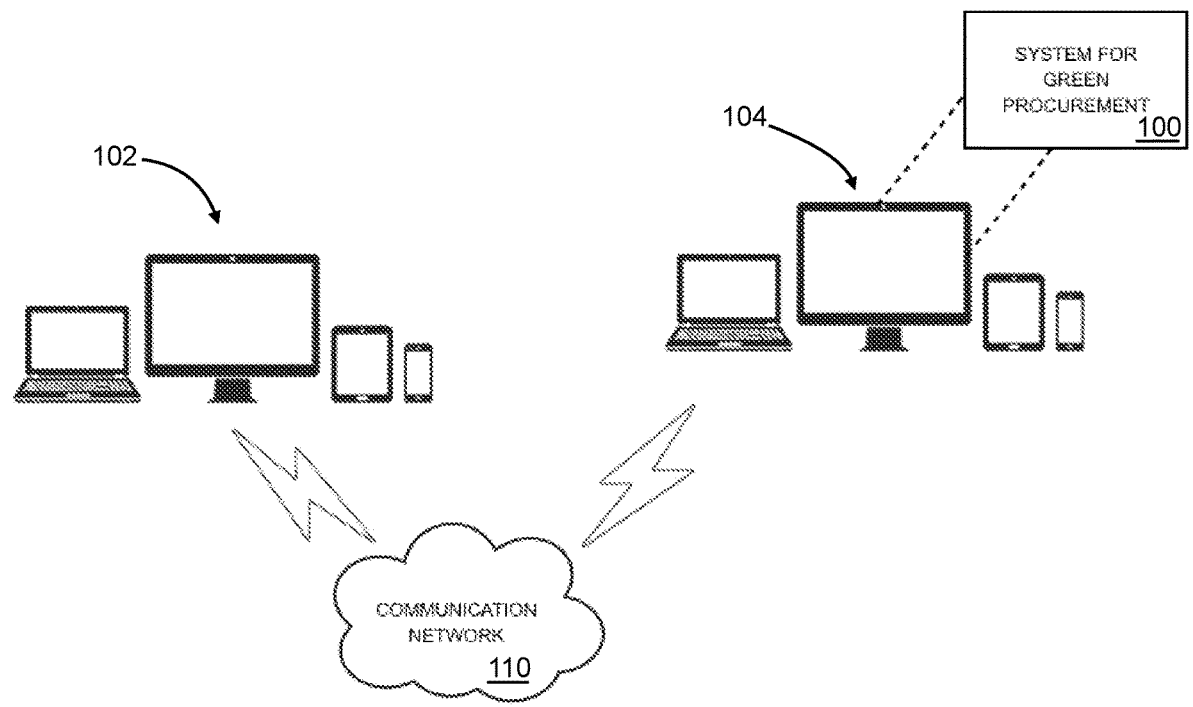
FIG. 1 shows an embodiment of the green procurement system.

One embodiment of the invention is implemented as a program product for use with a computer system. The program(s) of the program product defines functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive) on which information is permanently stored; (ii) writable storage media (e.g., floppy disks within a diskette drive or hard-disk drive) on which alterable information is stored. Such computer-readable storage media, when carrying computer-readable instructions that direct the functions of the present invention, are embodiments of the present invention. Other media include communications media through which information is conveyed to a computer, such as through a computer or telephone network, including wireless communications networks. The latter embodiment specifically includes transmitting information to/from the Internet and other networks. Such communications media, when carrying computer-readable instructions that direct the functions of the present invention, are embodiments of the present invention. Broadly, computer-readable storage media and communications media may be referred to herein as computer-readable media.

In general, the routines executed to implement the embodiments of the invention, may be part of an operating system or a specific application, component, program, module, object, or sequence of instructions. The computer program of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

For simplicity and clarity of illustration, the drawing figures illustrate the general manner of construction, and descriptions and details of well-known features and techniques may be omitted to avoid unnecessarily obscuring the invention. Additionally, elements in the drawing figures are not necessarily drawn to scale. For example, the dimensions of some of the elements in the figures may be exaggerated relative to other elements to help improve understanding of embodiments of the present invention. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof, are intended to cover a non-exclusive inclusion, such that a process, method, system, article, device, or apparatus that comprises a list of elements is not necessarily limited to those elements, but may include other elements not expressly listed or inherent to such process, method, system, article, device, or apparatus The terms "couple," "coupled," "couples," "coupling," and the like should be broadly understood and refer to connecting two or more elements or signals, electrically, mechanically or otherwise. Two or more electrical elements may be electrically coupled, but not mechanically or otherwise coupled; two or more mechanical elements may be mechanically coupled, but not electrically or otherwise coupled; two or more electrical elements may be mechanically coupled, but not electrically or otherwise coupled. Coupling (whether mechanical, electrical, or otherwise) may be for any length of time, e.g., permanent or semi-permanent or only for an instant.

DETAILED DESCRIPTION

Having summarized various aspects of the present disclosure, reference will now be made in detail to that which is illustrated in the drawings. While the disclosure will be described in connection with these drawings, there is no intent to limit it to the embodiment or embodiments disclosed herein. Rather, the intent is to cover all alternatives, modifications and equivalents included within the spirit and scope of the disclosure as defined by the appended claims.

A system and method for green procurement is provided that, in some embodiments, may allow a computing device associated with a buyer to receive a desired material request, generate at least one waste material listing, and receive a waste material order, thereby preserving virgin raw materials while also tracking such environmentally conscious transactions through one or more environmental metrics. The system and method may involve the buyer and/or the seller being an individual, professional, or a business entity. However, the term "seller" is used throughout the remainder of this disclosure and should be understood to include any type of purveyor of goods and/or services. Similarly, the term "buyer" is used throughout the remainder of this disclosure and should be understood to include any type of purchaser of goods and/or services.

FIG. 1 is illustrative of a networked environment in which an exemplary embodiment of a system for green procurement is implemented. As shown in FIG. 1, system 100 may comprise a computing device associated with a buyer 102 (alternatively, "buyer computing device") and a computing device associated with a seller 104 (alternatively, "seller computing device"). By way of example, and not limitation, the buyer computing device 102 and the seller computing device 104 are shown communicatively coupled via a communication network 110. Each of the computing devices 102, 104 may be embodied as a desktop computer, laptop computer, or a mobile computing device such as, for example and without limitation, a smartphone, or a tablet that incorporates Wi-Fi functionality and/or cellular telephone functionality. Notably, the communications network can use one or more of various communications types such as, for example and without limitation, wired, cellular and Wi-Fi communications. Moreover, each of the computing devices 102, 104 may be coupled to a power supply, which may be effectuated by way of a power cord, battery, and/or other means of supplying electrical power as may be available or otherwise desired.

The buyer computing device 102 and the seller computing device 104 may become members of a social network that enables them to interact with one another and exchange information, such as identity information associated with the buyer and the seller, a waste material listing, a waste material order, and other information pertinent to the aforementioned network center. In this exemplary embodiment, the network may be facilitated by a website that is hosted by network server. As such, the server may facilitate interaction among a limited group of members, as may be established by the members themselves. For the purpose of the example presented in FIG. 1, the limited group of members may include the buyer computing device 102 and the seller computing device 104.

Additionally, the server may implement the system for green procurement and facilitate sharing information related to the waste material order. Specifically, the server may implement the steps outlined in FIG. 2. Accordingly, members of the network 110 may access the server using their computing devices 102 and 104 to obtain information, input information, and receive notifications, such as text messages and push notifications regarding a desired material request or order status.

In order to facilitate the aforementioned functionality, various aspects may be performed by one or more of the computing devices 102, 104. In some embodiments, the buyer computing device 102 may be operative to receive identity information associated with the buyer. The identity information may comprise personal information, delivery information, and payment information.

Personal information may comprise a name, a telephone number, an electronic mail address, a mailing address, or other identifying information associated with the buyer. The payment information may comprise credit card number, debit card number, bank account number, routing number, or other financial information which may allow the seller to charge the buyer. The delivery information may comprise the buyer's home or business address or may comprise a different address unassociated with the buyer's home or business. In certain embodiments, the buyer computing device may be operative to filter at least one waste material listing based on the delivery information. Overall, the identity information may facilitate the transactions contemplated hereunder.

The buyer computing device 102 may be further operative to receive a desired material request from the buyer. The desired material request may be defined by one or more material characteristics and a timeline. In certain embodiments, the one or more material characteristics, and therefore the desired material request, may be defined by a specific material sought by the buyer. In alternate embodiments, the one or more material characteristics may not be defined by the specific material but rather may be defined by one or more properties comprising the one or more material characteristics.

In some embodiments, the one or more material characteristics may comprise end use, cost, environmental impact, geographic location, any known suitable raw materials and any properties of the desired material. Properties of the desired material may include any physical or chemical property, such as strength, malleability, and durability. The environmental impact may be based on predetermined standards or may be customizable by the buyer. In addition, the geographic location may comprise particular geographic coordinates or a geographic radius surrounding such coordinates. The seller and/or the buyer may define the geographic location. Further, the geographic location may be based on a delivery location selected by the buyer. In such embodiments, the delivery information provided by the buyer may comprise the delivery location. Meanwhile, in others, the delivery location may comprise a location different than the delivery information.

In accordance with certain embodiments, the buyer computing device 102 may be operative to display at least one waste material listing. The buyer computing device 102 may be further operative to filter in one or more of the one or more material characteristics. As one example, the buyer computing device 102 may be operative to filter in the geographic location. Based on the computing device 102 filtering in one or more of the one or more material characteristics, the business computing device 102 may thereafter be operative to identify one or more suitable waste materials, which may comprise one or more of the one or more material characteristics. In embodiments where the computing device 102 may filter the geographic location, the computing device 102 may identify the one or more suitable waste materials, which are located within the specified geographic region. Moreover, in embodiments where the one or more material characteristics may solely or mostly comprise the specific material, the one or more suitable waste materials may also comprise the specific material.

The buyer computing device 102 may also be operative to identify and display the at least one waste material listing. The at least one waste material listing may be based on the one or more suitable waste materials. Indeed, in some embodiments, the at least one waste material listing may comprise one or more listings of the same suitable waste material. In other embodiments, the at least one waste material listing may comprise one or more listings featuring different suitable waste materials. In further embodiments, the at least one waste material listing may display or otherwise indicate which of the one or more materials characteristics the at least one waste material listing comprises.

The desired material request may be further defined by the timeline. In some embodiments, the timeline may be defined as urgent, non-urgent, or ongoing. The seller may define urgent, non-urgent, or ongoing. In other embodiments, urgent, non-urgent, and ongoing may have predetermined definitions. The desired request may comprise a one-time request, which may be urgent or non-urgent. Alternatively, the desired request may comprise an ongoing request, which may be ongoing. The ongoing request may be defined temporally as an annual request, a monthly request, a weekly request, or a customizable request. The customizable request may follow a pattern (e.g., every specified number of days/weeks) or may follow a schedule selected by the buyer.

The buyer computing device 102 may be operative to filter in the timeline. Based on the computing device 102 filtering in the timeline, the business computing device 102 may thereafter be operative to identify one or more suitable waste materials, which may satisfy the timeline. The computing device 102 may be operative to display the at least one waste material listing based thereon. For instance, if the desired material request is defined as urgent, the one or more suitable waste materials and therefore, the at least one waste material listing may comprise only products which may be available on an urgent or timely basis.

In certain further embodiments, the seller computing device 104 may be operative to receive an opt-in for urgent request notifications from the seller. In such embodiments, the opt-in may indicate the seller has the ability and desire to provide goods or services in an emergency, or urgent, manner. In addition, the seller computing device 104 may be further operative to generate an urgent request notification. The urgent request notification may comprise a text message or a push notification or any other means of notifying the seller of the urgent desired material request.

The buyer computing device 102 may be operative to receive and transmit a waste material order from the buyer. The waste material order may be selected from one or more of the at least one waste material listing. The waste material order may comprise one of the at least one waste material listing from a single seller. Alternatively, the waste material order may comprise more than one of the at least one waste material listing from the single seller. In even further embodiments, the waste material order may comprise more than one of the at least one waste material listing from more than one seller.

In order to further facilitate the aforementioned functionality, the seller computing device 104 may be operative to receive identity information associated with the seller. The identity information may comprise personal information, geographic information, and financial information. The personal information may comprise a name, a telephone number, an electronic mail address, a mailing address, or other identifying information associated with the seller. The financial information may comprise a bank account number, routing number, accepted payment forms, or other financial information which may allow the seller to receive payment from the buyer. The geographic information may comprise the seller's home or business address. In alternate embodiments, the geographic information may comprise one or more geographic locations where a waste material supply may be located or stored. Overall, the identity information may facilitate the transactions contemplated hereunder.

In additional embodiments, the seller computing device 104 may be further operative to generate a seller account. In some embodiments, the seller account may be generated based on the identity information associated with the seller. The seller account may comprise an individual account or a professional account. The seller account may be a professional account when the seller may be a business, professional, or other individual or entity that has the ability or desire to routinely supply waste materials under this system. On the other hand, the seller account may be an individual account when the seller non-dependably or non-routinely desires to supply waste materials under this system.

The seller account may further comprise an occasional selling plan or an ongoing selling plan. The occasional selling plan may comprise sporadic or non-routine transactions. The ongoing selling plan may comprise routine or frequent transactions. In some embodiments, the ongoing selling plan and the occasional selling plan may correspond to differing transactional fees. In certain exemplary embodiments, the seller account may comprise the individual account having the occasional selling plan. In other embodiments, the seller account may comprise the individual account having the ongoing selling plan. In still further embodiments, the seller account may comprise the professional account having the occasional selling plan or the ongoing selling plan.

The seller computing device 104 may also be operative to receive the waste material supply from the seller. The waste material supply may comprise one or more waste materials possessed or owned by the seller and which the seller may desire to sell or offer for sale. The waste material supply may be defined by a material type, a material amount, a material cost, a material location, and a material timeline. The waste material location may comprise one or more geographic coordinates or alternatively, may comprise a geographic region in which the waste material supply may be made available by the seller. The material timeline may comprise an immediately available material, a later available material, or a material that is available on an ongoing basis. In other embodiments, the material timeline may vary per the availabilities and desires of the seller.

The seller computing device 104 may be operative to generate one of the at least one waste material listing. In some embodiments, the at least one waste material listing may be based on the waste material supply. Further, the waste material supply may correspond to more than one of the at least one waste material listing. The seller computing device 104 may be operative to receive the waste material order from the buyer computing device 102.

In accordance with certain embodiments, the buyer computing device 102 may be further operative to filter in the one-time request and/or the ongoing request. Responsive to the computing device 102 filtering in the one-time request, the buyer computing device 102 may be operative to display the occasional selling plan. In other embodiments, responsive to the computing device 102 filtering in the one-time request, the buyer computing device 102 may be operative to display the ongoing selling plan. In alternate embodiments, responsive to the computing device 102 filtering in the ongoing request, the buyer computing device 102 may be operative to display the ongoing selling plan.

In some embodiments, the buyer computing device 102 and/or the seller computing device 104 may be operative to filter in the one or more material characteristics, the one-time request and the ongoing request. In other embodiments, the computing devices 102, 104 may be operative to filter in only the one or more material characteristics. In such embodiments, for instance, one or more of the computing devices 102, 104 may be operative to filter in the geographic location. In still other embodiments, the computing devices 102, 104 may be operative to filter in the ongoing request or the one-time request.

Further, the buyer computing device 102 and/or the seller computing device 104 may be operative to generate and display one or more environmental metrics. The one or more environmental metrics may demonstrate environmental consciousness on the part of the buyer and/or the seller. In this manner, the one or more environmental metrics may bolster the environmental and CSR reports of the buyer and/or the seller. The one or more environmental metrics may comprise a landfill waste reduction, a raw material savings, an energy savings, a water savings, an emission reduction, a carbon credit, or one or more customizable metrics. In some embodiments, the buyer and/or the seller may customize which of the one or more environmental metrics to be tracked and/or displayed.

Figure 2:
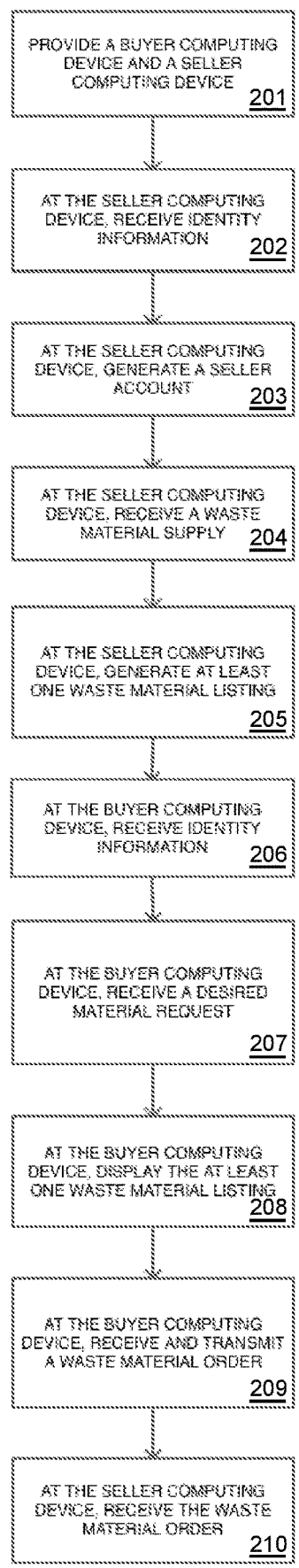
FIG. 2 shows an embodiment of the green procurement method.

According to some exemplary embodiments, the buyer computing device 102 and/or the seller computing device 104 may be operative to perform, at least in part, the method depicted in the flowchart of FIG. 2. In certain embodiments, the method shown in FIG. 2 may comprise one or more of the same elements discussed above with reference to FIG. 1. In alternate embodiments, one or more of the elements may different with respect to the method of FIG. 2.

With attention now to FIG. 2, this method includes the steps of: providing a buyer computing device and a seller computing device (block 201); receiving, at the seller computing device, identity information associated with the seller (block 202); generating, at the seller computing device, a seller account based on the identity information associated with the seller (block 203); receiving, at the seller computing device, a waste material supply from the seller (block 204); generating, at the seller computing device, at least one waste material listing based on the waste material supply (block 205); receiving, at the buyer computing device, identity information associated with the buyer (block 206); receiving, at the buyer computing device, a desired material request from the buyer, the desired material request defined by one or more material characteristics and a timeline (block 207); displaying, at the buyer computing device, the at least one waste material listing (block 208); receiving and transmitting, at the buyer computing device, a waste material order from the at least one waste listing (block 209); and receiving, at the seller computing device, the waste material order (block 210).

Figure 3:
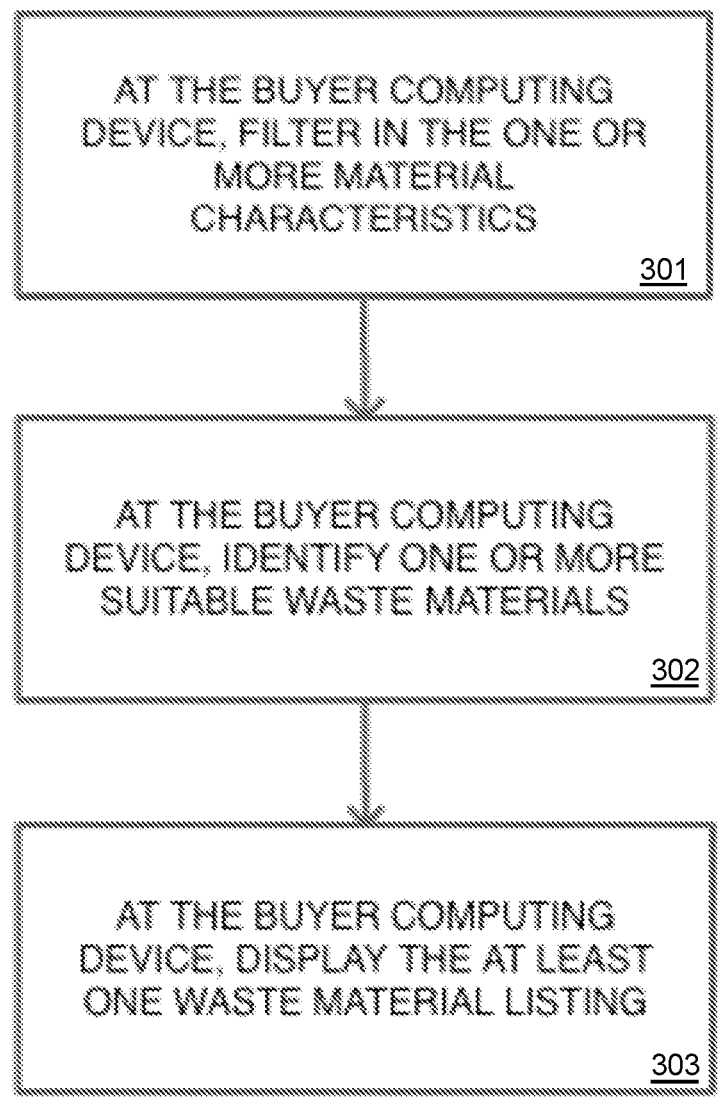
FIG. 3 shows an embodiment of the green procurement method.

FIG. 3 is a flowchart demonstrating another exemplary method for green procurement, such as may be performed by the buyer computing device 102 and the seller computing device 104. As shown in FIG. 3, the method may further comprise the steps of: filtering in, at the buyer computing device, the one or more material characteristics (block 301); responsive to the buyer computing device filtering in the one or more material characteristics, identifying, at the buyer computing device, one or more suitable waste materials (block 302); and identifying and displaying, at the buying computing device, the at least one waste material listing based on the one or more suitable waste materials (block 303).

Figure 4:
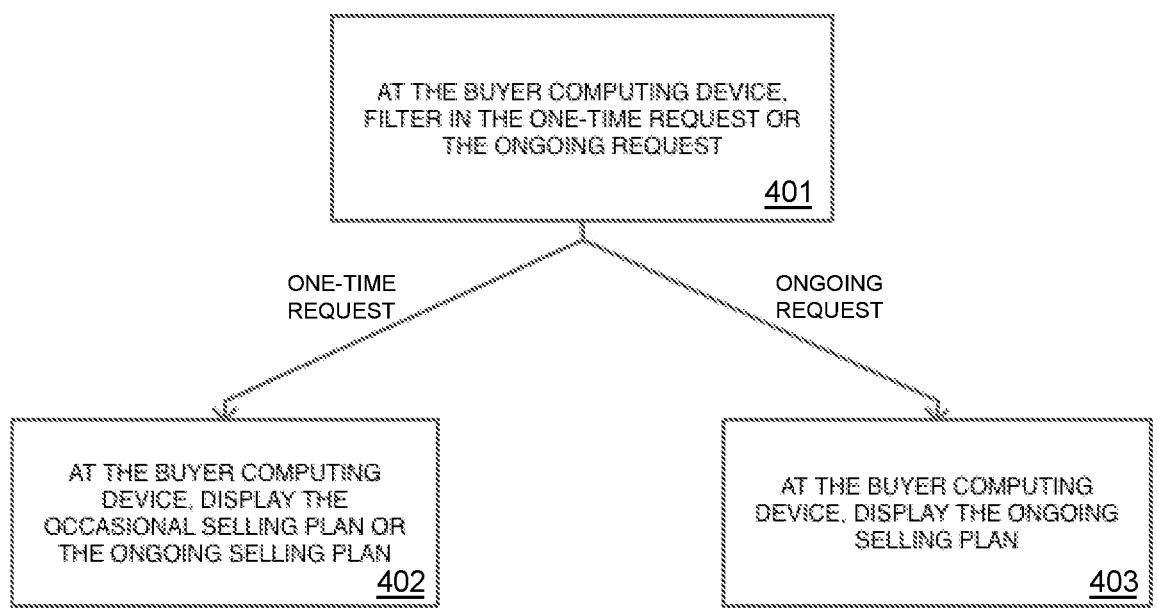
FIG. 4 shows an embodiment of the green procurement method.

Finally, FIG. 4 is a flowchart of another embodiment of the method for green procurement. As with FIGS. 2-3, the computing devices 102, 104 may be operative to perform the steps of the method depicted in FIG. 4. In particular, the method may comprise: filtering in, at the buyer computing device, the one-time request or the ongoing request (block 401); responsive to the buyer computing device filtering in the one-time request, displaying, at the buyer computing device, the occasional selling plan or the ongoing selling plan (block 402); and responsive to the buyer computing device filtering in the ongoing request, displaying, at the buyer computing device, the occasional selling plan (block 403).

If embodied in software, it should be noted that each block depicted in the accompanying flowcharts represents a module, segment, or portion of code that comprises program instructions stored on a non-transitory computer readable medium to implement the specified logical function(s). In this regard, the program instructions may be embodied in the form of source code that comprises statements written in a programming language or machine code that comprises numerical instructions recognizable by a suitable execution system such as the computing devices 102, 104. The machine code may be converted from the source code, etc. If embodied in hardware, each block may represent a circuit or a number of interconnected circuits to implement the specified logical function(s). Additionally, although the flowcharts show specific orders of execution, it is to be understood that the orders of execution may differ.

Figure 5:
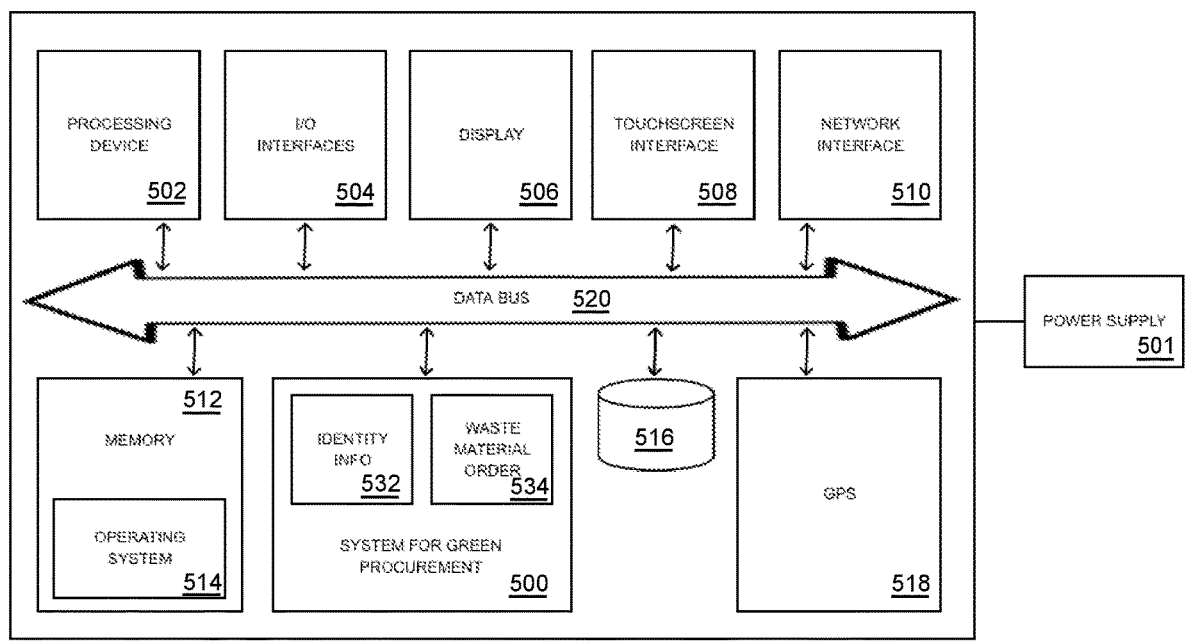
FIG. 5 shows an embodiment of the green procurement system.

FIG. 5 illustrates the buyer computing device 102 shown in FIG. 1. As described earlier, the buyer computing device 102 may be a tablet computer, laptop computer, desktop computer, or smartphone but may also be embodied in any one of a wide variety of wired and/or wireless computing devices. As shown in FIG. 5, the buyer computing device 102 may include a processing device (processor) 502, input/output interfaces 504, a display 506, a touchscreen interface 508, a network interface 510, a memory 512, an operating system 514, a mass storage 516 and a GPS 518, with each communicating across a local data bus 520. Additionally, the buyer computing device 102 may incorporate a system for green procurement 500, which is depicted as including identity information 532 and the waste material order 534, although the location of information 532, 534 could vary. The buyer computing device may further comprise a power supply 501.

Figure 6:
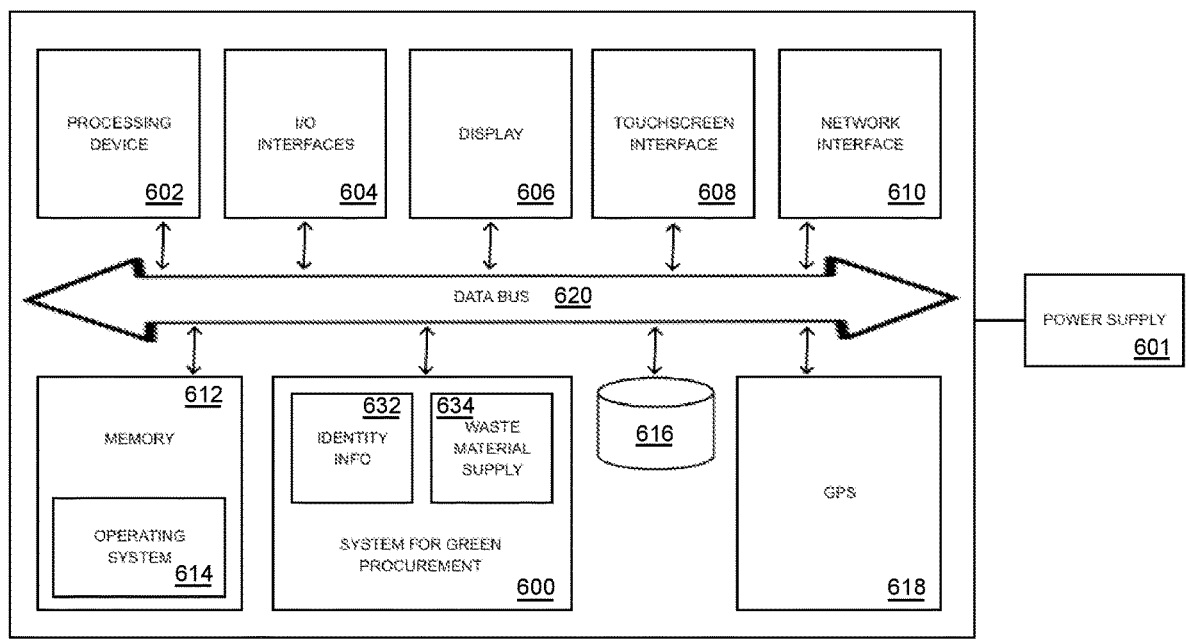
FIG. 6 shows an embodiment of the green procurement system.

FIG. 6 illustrates the seller computing device 104 shown in FIG. 1. As described earlier, the seller computing device 104 may be a tablet computer, laptop computer, desktop computer, or smartphone but may also be embodied in any one of a wide variety of wired and/or wireless computing devices. As shown in FIG. 6, the seller computing device 104 may include a processing device (processor) 602, input/output interfaces 604, a display 606, a touchscreen interface 608, a network interface 610, a memory 612, an operating system 614, a mass storage 616 and a GPS 618, with each communicating across a local data bus 620. Additionally, the seller computing device 104 may incorporate a system for green procurement 600, which is depicted as including identity information 632 and the waste material supply 634, although the location of information 632, 634 could vary. The seller computing device may further comprise a power supply 601.

Referring now to FIGS. 5-6, the processing device 502, 602 may include any custom made or commercially available processor, a central processing unit (CPU) or an auxiliary processor among several processors associated with the buyer computing device 102 and the seller computing device 104, a semiconductor based microprocessor (in the form of a microchip), a macroprocessor, one or more application specific integrated circuits (ASICs), a plurality of suitably configured digital logic gates, and other electrical configurations comprising discrete elements both individually and in various combinations to coordinate the overall operation of the system.

The memory 512, 612 may include any one of a combination of volatile memory elements (e.g., random-access memory (RAM, such as DRAM, and SRAM, etc.)) and nonvolatile memory elements. The memory may typically comprise native operating system 514, 614, one or more native applications, emulation systems, or emulated applications for any of a variety of operating systems and/or emulated hardware platforms, emulated operating systems, etc. For example, the applications may include application specific software which may comprise some or all the components of the computing devices 102, 104. In accordance with such embodiments, the components may be stored in memory and executed by the processing device. Note that although depicted separately in FIGS. 5-6, the system and method for green procurement 500, 600 may be resident in memory such as memory 512, 612.

Touchscreen interface 508, 608 may be configured to detect contact within the display area of the display 506, 606 and may provide such functionality as on-screen buttons, menus, keyboards, etc. that allows users to navigate user interfaces by touch. For some embodiments, the buyer computing device 102 and/or the seller computing device may comprise GPS 518, 618 or other means to determine the location of the computing devices 102, 104 and relatedly, the buyer or the seller.

One of ordinary skill in the art will appreciate that the memory 514, 614 may, and typically will, comprise other components which have been omitted for purposes of brevity. Note that in the context of this disclosure, a non-transitory computer-readable medium stores one or more programs for use by or in connection with an instruction execution system, apparatus, or device. With further reference to FIGS. 5-6, network interface device 510, 610 may comprise various components used to transmit and/or receive data over a networked environment such as depicted in FIG. 1. When such components are embodied as an application, the one or more components may be stored on a non-transitory computer-readable medium and executed by the processing device.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

CONCLUSIONS, RAMIFICATIONS, AND SCOPE

While certain embodiments of the invention have been illustrated and described, various modifications are contemplated and can be made without departing from the spirit and scope of the invention. For example, there may be more than one buyer and more than one selling transacting with more than one waste material. Accordingly, it is intended that the invention not be limited, except as by the appended claims.

The teachings disclosed herein may be applied to other systems, and may not necessarily be limited to any described herein. The elements and acts of the various embodiments described above can be combined to provide further embodiments. All of the above patents and applications and other references, including any that may be listed in accompanying filing papers, are incorporated herein by reference. Aspects of the invention can be modified, if necessary, to employ the systems, functions and concepts of the various references described above to provide yet further embodiments of the invention.

Particular terminology used when describing certain features or aspects of the invention should not be taken to imply that the terminology is being refined herein to be restricted to any specific characteristics, features, or aspects of the system and method for green procurement with which that terminology is associated. In general, the terms used in the following claims should not be constructed to limit the system and method for green procurement to the specific embodiments disclosed in the specification unless the above description section explicitly define such terms. Accordingly, the actual scope encompasses not only the disclosed embodiments, but also all equivalent ways of practicing or implementing the disclosed system, method and apparatus. The above description of embodiments of the system and method for green procurement is not intended to be exhaustive or limited to the precise form disclosed above or to a particular field of usage.

While specific embodiments of, and examples for, the method, system, and apparatus are described above for illustrative purposes, various equivalent modifications are possible for which those skilled in the relevant art will recognize.

While certain aspects of the method and system disclosed are presented below in particular claim forms, various aspects of the method, system, and apparatus are contemplated in any number of claim forms. Thus, the inventor reserves the right to add additional claims after filing the application to pursue such additional claim forms for other aspects of the system and method for green procurement.

What is claimed is:

1. A green procurement system, comprising:
a first computing device associated with a buyer comprising a processor, a memory, a network interface, an input/output interface and a display, the processor being operatively coupled to the memory and the display, and the first computing device operative to:
execute computer-readable instructions stored in the memory to generate a screen on the first computing device display prompting the buyer to input identity information associated with such buyer and receive identity information associated with the buyer;
receive via the first computing device input/output interface a desired material request from the buyer, the desired material request defined by one or more material characteristics and a timeline, wherein the timeline is determined by the buyer;
determine, at the first computing device, at least one waste material listing based at least in part on the timeline;
display via a graphical user interface rendered on the first computing device display the at least one waste material listing;
via the first computing device input/output interface, receive a waste material order from one or more of the at least one waste material listing; and
in response to receiving the waste material order, transmit the waste material order from one or more of the at least one waste material listings to a second computing device over a communication network via the network interface; and
the second computing device associated with a seller comprising a processor, a memory, a network interface, an input/output interface and a display, the processor being operatively coupled to the memory and display, and the second computing device being operative to
execute computer-readable instructions stored in the memory to generate a screen on the second computing device display prompting the seller to input identity information associated with such seller and receive identity information associated with the seller;
generate a seller account based on the identity information associated with the seller;
receive a waste material supply from the seller;
generate one of the at least one waste material listing based on the waste material supply; and
receive the waste material order via the network interface and store it in the memory for processing by the processor;
wherein the first and second computing devices are communicatively coupled to a server that facilitates sharing information between such devices via a communication network;
wherein the system is operative to identify and track one or more environmental metrics to provide quantifiable insights into any environmental benefits of sourcing the waste material for use rather than virgin raw materials, and
wherein the system is further operative to provide environmental metric data for use in corporate social responsibility (CSR) reporting, sustainability benchmarking, and regulatory compliance assessments.

2. The green procurement system of claim 1, wherein the first computing device and the second computing device are further operative to
generate and display the one or more environmental metrics via the respective first computing device and second computing device graphical user interfaces.

3. The green procurement system of claim 1, wherein the one or more environmental metrics are configured to facilitate environmental impact assessments, including quantification of landfill waste reduction, raw material savings, energy savings, water savings, emission reduction, a carbon credit, or one or more customizable metrics for corporate social responsibility (CSR) reporting.

4. The green procurement system of claim 1, wherein the first computing device is further operative to
filter in one or more of the one or more material characteristics;
responsive to the computing device filtering in one or more of the one or more material characteristics, identify one or more suitable waste materials; and
identify and display the at least one waste material listing based on the one or more suitable waste materials.

5. The green procurement system of claim 1, wherein the one or more material characteristics comprise end use, cost, environmental impact, any known suitable raw materials, geographic location, and any properties of the desired material.

6. The green procurement system of claim 1, wherein the seller account is an individual account or a professional account.

7. The green procurement system of claim 1,
wherein the seller account comprises an occasional selling plan or an ongoing selling plan; and
the desired material request comprises a one-time request or an ongoing request.

8. The green procurement system of claim 7, wherein
the ongoing request is defined temporally as an annual request, a monthly request, a weekly request, or a customizable request; and
the one-time request is defined temporally as urgent or non-urgent.

9. The green procurement system of claim 7, wherein the first computing device is further operative to
filter in the one-time request or the ongoing request;
responsive to the computing device filtering in the one-time request, display the occasional selling plan or the ongoing selling plan
responsive to the computing device filtering in the ongoing request, display the ongoing selling plan.

10. A method for green procurement, comprising
providing a buyer computing device comprising a processor, a memory, a network interface, an input/output interface, and a display, the processor being operatively coupled to the memory and the display, and a seller computing device comprising a processor, a memory, a network interface, an input/output interface, and a display, the processor being operatively coupled to the memory and the display, the buyer and seller computing devices being operative to execute computer-readable instructions stored in the memory and communicatively coupled to a server that facilitates sharing information between such devices via a communication network;

at the seller computing device input/output interface,
  receiving identity information associated with the seller;
  generating a seller account based on the identity information associated with the seller;
  receiving a waste material supply from the seller;
  generating at least one waste material listing based on the waste material supply;
at the buyer computing device input/output interface,
  receiving identity information associated with the buyer;
  receiving a desired material request from the buyer, the desired material request defined by one or more material characteristics and a timeline, wherein the timeline is determined by the buyer;
  upon a determination that the at least one waste material listing satisfies the timeline, displaying on a screen the at least one waste material listing;
  receiving a waste material order from the at least one waste material listing; and
at the seller computing device,
  responsive to receiving the waste material order, transmitting a waste material order from the at least one waste material listing over the communication network via the network interface; and
  receiving the waste material order;
at the buyer computing device and the seller computing device,
  identifying and tracking one or more environmental metrics to provide quantifiable insights into any environmental benefits of sourcing the waste material for use rather than virgin raw materials, and
  generating and displaying environmental metric data for use in corporate social responsibility (CSR) reporting, sustainability benchmarking, and regulatory compliance assessments.

11. The method of claim 10, further comprising
at the buyer computing device and the seller computing device,
  generating and displaying the one or more environmental metrics.

12. The method of claim 10, wherein the one or more environmental metrics are configured to facilitate environmental impact assessments including quantification of landfill waste reduction, raw material savings, energy savings, water savings, emission reduction, a carbon credit, or one or more customizable metrics for CSR reporting.

13. The method of claim 10, wherein the desired material request is further defined by one or more material characteristics or one or more end uses and further comprising
at the buyer computing device,
  filtering in the one or more material characteristics;
  responsive to the buyer computing device filtering in the one or more material characteristics, identifying one or more suitable waste materials; and
  identifying and displaying the at least one waste material listing based on the one or more suitable waste materials.

14. The method of claim 11, wherein the seller account comprises an occasional selling plan or an ongoing selling plan and the desired material request comprises a one-time request or an ongoing request, and further comprising
at the buyer computing device,
  filtering in the one-time request or the ongoing request;
  responsive to the computing device filtering in the one-time request, displaying the occasional selling plan or the ongoing selling plan; and
  responsive to the computing device filtering in the ongoing request, displaying the occasional selling plan.

15. A non-transitory, tangible computer-readable medium having stored thereon computer-executable instructions, which, when executed by a computer processor, enable performance of a method comprising:
  providing a buyer computing device and a seller computing device, each having a processor, a memory, a network interface, an input/output interface and a display, the processor being operatively coupled to the memory and the display, each computing device communicatively coupled to a server that facilitates sharing information between one another via a communication network;
  generating a screen on the seller computing device display a prompt to input identity information associated with the seller;
  receiving, at the seller computing device input/output interface, identity information associated with the seller;
  generating, at the seller computing device, a seller account based on the identity information associated with the seller;
  receiving, at the seller computing device, a waste material supply from the seller;
  generating, at the seller computing device display, at least one waste material listing based on the waste material supply;
  generating a screen on the buyer computing device display a prompt to input identity information associated with the buyer;
  receiving, at the buyer computing device input/output interface, identity information associated with the buyer;
  generating, at the buyer computing device, a buyer account based on the identity information associated with the buyer;
  receiving, at the buyer computing device display, a desired material request from the buyer, the desired material request comprising a material type, a material amount, a delivery location, and a timeline, wherein the timeline is determined by the buyer;
  upon a determination that the at least one waste material listing satisfies the timeline, displaying on a screen at the buyer computing device, the at least one waste material listing;
  receiving, at the buyer computing device display, a waste material order from the at least one waste material listing;
  responsive to receiving the waste material order, transmitting the waste material order from one or more of the at least one waste material listings to the seller computing device over the communication network via the network interface;
  receiving, at the seller computing device, the waste material order
  identifying and tracking one or more environmental metrics operative to provide quantifiable insights into any environmental benefits of sourcing the waste material for use rather than virgin raw materials, and
  providing environmental metric data for use in corporate social responsibility (CSR) reporting, sustainability benchmarking, and regulatory compliance assessments.

16. The medium of claim 15, wherein the method further comprises generating and displaying, at a screen on the buyer and seller computing device displays, the one or more environmental metrics.

17. The medium of claim 15, wherein the desired material request is further defined by one or more material characteristics or one or more end uses.

18. The medium of claim 17, wherein the method further comprises
   filtering, at the buyer computing device, in the one or more material characteristics and the one or more end uses;
   responsive to the buyer computing device filtering in the one or more end uses, at the buyer computing device, identifying one or more suitable waste materials; and
   identifying and displaying, at the buyer computing device, the at least one material listing based on the one or more suitable waste materials.

19. The medium of claim 15, wherein the seller account comprises an occasional selling plan or an ongoing selling plan and the desired material request comprises a one-time request or an ongoing request.

20. The medium of claim 19, wherein the method further comprises
   filtering, at the buyer computing device, in the one-time request or the ongoing request;
   responsive to the computing device filtering in the one-time request, at the buyer computing device, displaying the occasional selling plan or the ongoing selling plan; and
responsive to the computing device filtering in the ongoing request, at the buyer computing device, displaying the occasional selling plan.

* * * * *